US 8,412,562 B1

(12) United States Patent
Fairfield et al.

(10) Patent No.: US 8,412,562 B1
(45) Date of Patent: *Apr. 2, 2013

(54) RETAIL HIGH PERFORMANCE CAPABILITY ASSESSMENT

(75) Inventors: Daren K. Fairfield, Holland, MI (US);
Melissa R. Zilinski, Medfield, MA (US);
Chris Chapman, London (GB); Arsenio M. Santos, Sao Paulo (BR)

(73) Assignee: Accenture Global Services Limited, Dublin (IE)

( * ) Notice: Subject to any disclaimer, the term of this patent is extended or adjusted under 35 U.S.C. 154(b) by 1245 days.

This patent is subject to a terminal disclaimer.

(21) Appl. No.: 12/124,010

(22) Filed: May 20, 2008

Related U.S. Application Data

(63) Continuation of application No. 11/823,112, filed on Jun. 25, 2007, now abandoned.

(51) Int. Cl.
*G06Q 10/00* (2012.01)
*G06Q 30/00* (2012.01)
(52) U.S. Cl. .............. 705/7.38; 705/7.39; 705/7.29
(58) Field of Classification Search ............ 705/7.29, 705/7.38, 7.39
See application file for complete search history.

(56) References Cited

U.S. PATENT DOCUMENTS

| | | | |
|---|---|---|---|
| 6,256,773 B1 | 7/2001 | Bowman-Amuah | |
| 6,324,647 B1 | 11/2001 | Bowman-Amuah | |
| 6,370,573 B1 | 4/2002 | Bowman-Amuah | |
| 6,601,233 B1 | 7/2003 | Underwood | |
| 6,957,186 B1 | 10/2005 | Guheen et al. | |
| 2002/0035495 A1 | 3/2002 | Spira et al. | |
| 2002/0099563 A1* | 7/2002 | Adendorff et al. | 705/1 |
| 2003/0083912 A1* | 5/2003 | Covington et al. | 705/7 |
| 2003/0110067 A1 | 6/2003 | Miller et al. | |
| 2004/0098299 A1* | 5/2004 | Ligon et al. | 705/10 |
| 2005/0216320 A1* | 9/2005 | Hattaway | 705/7 |

OTHER PUBLICATIONS

Shan Pan, Gary Pan, & Ming H Hsieh. (2006). A dual-level analysis of the capability development process: A case study of TT&T. Journal of the American Society for Information Science and Technology, 57(13), 1814. Retrieved Jul. 3, 2012, from ABI/INFORM Global. (Document ID: 1164910861).*
Brochure, "High Performance Acceleration: Global Retail Process Model," Accenture, High Performance Delivered, 2007.
Handbook, Software Engineering Institute, "A Description of the Systems Engineering Capability Maturity Model Appraisal Method Version 1.1," Mar. 1996.
Keith A. Heston, "Achieving Delivery Excellence Using the Capability Maturity Model Integration," *Accenture, High Performance Delivered*, 2006.
Report, Software Engineering Institute, "A Systems Engineering Capability Maturity Model, Version 1.1.," Nov. 1995.
Walker Royce, "CMM vs. CMMI: From Conventional to Modern Software Management," *The Rational Edge*, 2002.
Non-Final Office Action dated Apr. 28, 2011, issued in related U.S. Appl. No. 12/129,080.
U.S. Appl. No. 11/823,112, filed Jun. 25, 2007.
U.S. Appl. No. 12/129,080, filed May 29, 2008.
U.S. Appl. No. 61/086,927, filed Aug. 7, 2008.

(Continued)

*Primary Examiner* — Jonathan G Sterrett
*Assistant Examiner* — Folashade Anderson
(74) *Attorney, Agent, or Firm* — Brinks Hofer Gilson & Lione

(57) ABSTRACT

A capability analysis structure helps a modern business meet the challenges of the global marketplace. As a result, the business can achieve the clarity, consistency, and well-defined execution of its core processes that reduce inefficiencies and waste due to unnecessary process complexity and exceptions. In addition, the capability analysis structure helps the business to identify specific areas in which improvements may be made and understand how to make the improvements, and establishes levels of capability along the way to reaching an ultimate capability goal.

18 Claims, 9 Drawing Sheets

OTHER PUBLICATIONS

U.S. Appl. No. 12/194,793, filed Aug. 20, 2008.
U.S. Appl. No. 61/092,225, filed Aug. 27, 2008.
U.S. Appl. No. 12/324,150, filed Nov. 26, 2008.
U.S. Appl. No. 61/154,832, filed Feb. 24, 2009.
U.S. Appl. No. 61/154,945, filed Feb. 24, 2009.
U.S. Appl. No. 61/164,640, filed Mar. 30, 2009.
U.S. Appl. No. 61/164,618, filed Mar. 30, 2009.
U.S. Appl. No. 12/427,201, filed Apr. 21, 2009.
U.S. Appl. No. 12/471,767, filed May 26, 2009.
U.S. Appl. No. 12/479,310, filed Jun. 5, 2009.
U.S. Appl. No. 12/548,673, filed Aug. 27, 2009.
U.S. Appl. No. 12/701,914, filed Feb. 8, 2010.
U.S. Appl. No. 12/710,900, filed Feb. 23, 2010.
U.S. Appl. No. 12/710,662, filed Feb. 23, 2010.
U.S. Appl. No. 12/713,647, filed Feb. 26, 2010.
U.S. Appl. No. 12/713,597, filed Feb. 26, 2010.

* cited by examiner

RETAIL HIGH PERFORMANCE CAPABILITY ASSESSMENT

CROSS-REFERENCE TO RELATED APPLICATIONS

This application claims the benefit of priority from co-pending application Ser. No. 11/823,112, filed on Jun. 25, 2007, entitled Capability Analysis Structure and System. Application Ser. No. 11/823,112 is hereby incorporated by reference in its entirety.

BACKGROUND OF THE INVENTION

1. Technical Field

This disclosure relates to analyzing organizational capability and identifying where the organizational capability exists on a scale of representative capabilities.

2. Related Art

Modern businesses operate in an increasingly competitive environment. To survive, businesses must adapt to this environment and execute in a clear, consistent, and efficient manner. Furthermore, the global nature of many businesses greatly increases the complexity and difficulty of surviving on a day to day basis, let alone growing and prospering.

Despite the need for a modern business to meet the challenges of the global marketplace, it is still often the case that the business lacks clarity, consistency, and well-defined execution of its core processes. These shortcomings severely constrain the business, and lead directly to inefficiencies and waste due to unnecessary complexity, process exceptions, and customer dissatisfaction. At the same time, it can be very difficult to identify specific processes to which improvements may be made, either because the business itself does not have the expertise to identify the processes or because the complexities of the business frustrate attempts to clearly delineate the processes to be improved.

Even if the business, on its own, could identify one of the many processes that it needs to improve, the business would not necessarily know how to improve the process or be able to identify a concrete and measurable improvement goal. Another difficulty exists in determining whether there are any intermediate goals that should be reached along the way. As a result, businesses struggle to meet the demands of the modern marketplace and fail to identify opportunities for margin improvement, category expansion, portfolio optimization, multi-channel execution, selling performance, and to reach other important goals.

Therefore, a need exists for a comprehensive capability analysis model and capability analysis system.

SUMMARY

A capability analysis structure helps a modern business, such as retail businesses, meet the challenges of the global marketplace by defining a scale of mastery along which the business may locate its current practices. The capability analysis structure accelerates the discovery of hidden process overlaps and process or capability gaps within business operations. In addition, the capability analysis structure helps the business to identify specific areas in which improvements may be made, how to make the improvements, and how to establish levels of capability along the way to an ultimate capability goal. As a result, the business can achieve the clarity, consistency, and well-defined execution of its core processes that reduce inefficiencies and waste due to unnecessary process complexity and exceptions.

The capability analysis structure includes a key factor dimension and a capability scale dimension. The capability scale dimension defines multiple capability levels. The capability levels may form a scale of increasing organizational capability. On example of such a scale includes a 'Basic' capability level, followed by a 'Progressive' capability level, followed by a 'Leading' capability level, followed by an 'Emerging' capability level.

The key factor dimension establishes a consistent set of key analysis areas in which to analyze business processes. Examples of key analysis areas include a process participation key analysis area, a process creation key analysis area, and a process frequency key analysis area. Additional examples of key analysis areas include a process inputs key analysis area, a process outputs key analysis area, a process automation key analysis area, and a process integration key analysis area.

Representative practice data populates the capability analysis structure. The representative practice data may be specific to any one of many different business processes. For example, a capability analysis structure for corporate strategy includes representative practice data for corporate strategy at each of the capability levels along the capability scale dimension and in each of the key analysis areas along the key factor dimension. Any number of pre-defined capability analysis structures may be defined and stored in a process detail pool for subsequent retrieval and application to a business under examination. Accordingly, the capability analysis structure provides a flexible and adaptive scale of mastery against which business practices may be compared to ascertain where the capabilities of a business under examination fall along the scale.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The capability analysis structure and system may be better understood with reference to the following drawings and description. The elements in the figures are not necessarily to scale, emphasis instead being placed upon illustrating the principles of the capability analysis techniques. In the figures, like-referenced numerals designate corresponding parts throughout the different views.

DETAILED DESCRIPTION OF THE PREFERRED EMBODIMENTS

Figure 1:
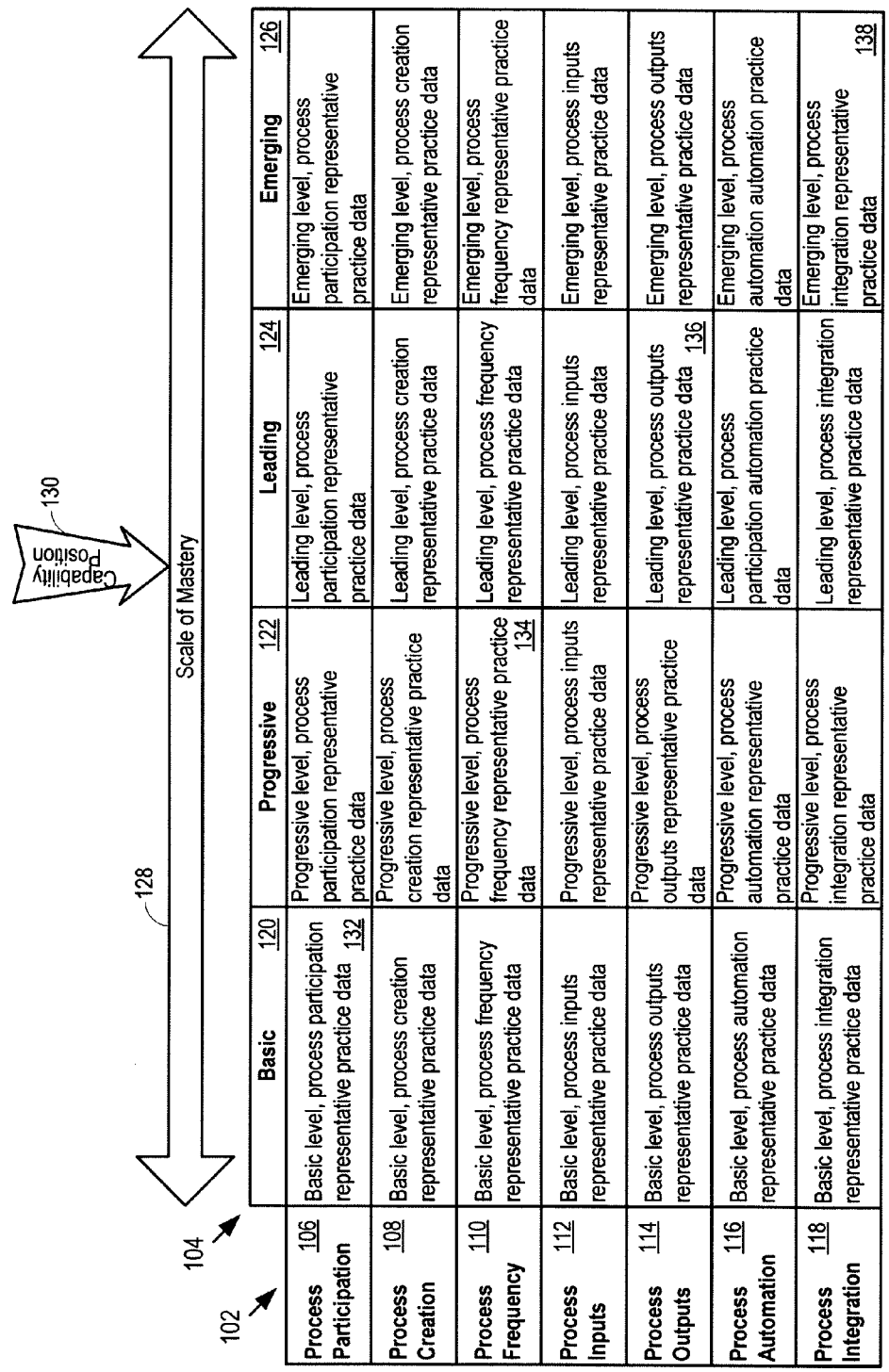
FIG. 1 shows a specific example of a capability analysis structure.

FIG. 1 shows a capability analysis structure 100. The capability analysis structure 100 specifies seven analysis dimensions, referred to below as key analysis areas 102. In particular, the key analysis areas 102 include a process participation key analysis area 106, a process creation key analysis area 108, and a process frequency key analysis area 110. In addition, the key analysis areas 102 include a process inputs key analysis area 112, a process outputs key analysis area 114, a process automation key analysis area 116, and a process integration key analysis area 118. Tables 1-7, below, provide an explanation of each of the key analysis areas 106-118.

The capability analysis structure 100 also defines multiple capability levels 104. The capability levels 104 establish a scale of increasing organizational capability. In FIG. 1, the capability levels 104 start with a 'Basic' capability level 120, that is followed by a 'Progressive' capability level 122, that is followed up by a 'Leading' capability level 124, and that ends with an 'Emerging' capability level 126. Accordingly, the capability analysis structure 100 establishes a scale of mastery 128 along which a business process may be located and categorized with reference to representative practice data. More specifically, the business process under evaluation may be assigned a capability position 130 along the scale of mastery 128 (e.g., the business process falls into the 'Leading' capability level). Tables 8-11, below, provide an explanation of each of the capability levels 104.

Representative practice data populates the capability analysis structure 100. The representative practice data captures criteria, characteristics, or other features of a business process at a specific capability level in a specific key analysis area. For example, FIG. 1 shows that each capability level at each key analysis area may include representative practice data. FIG. 1 specifically labels 'Basic' process participation representative practice data 132, 'Progressive' process frequency representative practice data 134, 'Leading' process outputs representative practice data 136, and 'Emerging' process integration representative practice data 138. Specific examples of representative practice data for retail organizations are given below.

A capability analysis structure with representative practice data provides a tool for determining where a process under examination falls along the scale of mastery 128. For example, business consultants may interview a business to determine, measure, or otherwise ascertain the characteristics, criteria, and other features of a particular process as it is implemented at the business. The business consultants may then use their expertise to compare the determined characteristics to the representative practice data in the capability analysis structure and arrive at a capability position 134 for the process under examination. In doing so, for example, the business consultants may identify where the process under examination falls in terms of capability level in each of the specific key analysis areas, then determine an overall position on the scale of mastery 128 for the process under examination.

The following Tables 1-7 provide an explanation of each of the key analysis areas 106-118:

TABLE 1

Process Participation Key Analysis Area

| | |
|---|---|
| Description: | Describes who participates in the process execution or approval. |

TABLE 1-continued

Process Participation Key Analysis Area

| | |
|---|---|
| Criteria: | Number of participants involved or informed - having more participants is generally considered a characteristic of greater mastery. |
| | Level of internal (within the company) and external (outside the company) collaboration among the participants - greater collaboration is generally considered a characteristic of greater mastery. |
| | Number of functional/process areas represented by the participants - more representation is generally considered a characteristic of greater mastery. |
| | Degree of participation across levels - senior executives, directors, managers, and other levels - a greater participation across levels is generally considered a characteristic of greater mastery. |

TABLE 2

Process Creation Key Analysis Area

| | |
|---|---|
| Description: | Outlines how the process is executed and highlights the key points that serve as differentiators in process capability and sophistication across the scale of mastery. |
| Criteria: | Is the process standard and repeatable (generally considered a characteristic of greater mastery) or non-standard and inconsistent (generally considered a characteristic of lower mastery)? |
| | Is the process transparent and visible across the organization (generally considered a characteristic of greater mastery) vs. isolated and not clearly understood (generally considered a characteristic of lower mastery)? |
| | Are results reviewed, iterated, and approved (generally considered a characteristic of greater mastery), or is there no governance or no ability to influence or change (generally considered a characteristic of lower mastery)? |
| | Is the process flexible and adaptable (generally considered a characteristic of greater mastery), or is the process inflexible and rigid, difficult to change (generally considered a characteristic of lower mastery)? |
| | Does executing the process and the results generated contribute significantly to business performance (generally considered a characteristic of greater mastery), or does execution have a little or unknown impact on business performance (generally considered a characteristic of lower mastery)? |

TABLE 3

Process Frequency Key Analysis Area

| | |
|---|---|
| Description: | Describes the number of times and frequency at which a process is executed, or the number of iterations allowed prior to completion. |
| Criteria: | Low frequency versus high frequency, with higher frequency generally considered a characteristic of greater mastery where it facilitates or demonstrates ease of execution, and results in more rapid continuous improvement or adjustment that is meaningful. |
| | Ability to iterate more frequently and more often, as opposed to a single chance, with more iterative capability generally considered a characteristic of greater mastery. |
| | Speed and accuracy at which a process is completed - with higher speed and accuracy generally considered a characteristic of greater mastery. |
| | The frequency at which a process is measured and refined to ensure optimal execution, with more frequent measurement generally considered a characteristic of greater mastery. |

TABLE 3-continued

Process Frequency Key Analysis Area

Frequency driven and executed by process needs is generally considered a characteristic of greater mastery, rather than frequency driven by calendar constraints which is generally considered a characteristic of lower mastery.

TABLE 4

Process Inputs Key Analysis Area

| | |
|---|---|
| Description: | Data, intentions, decisions, objectives, materials, information, events, and outputs from other processes are all considered possible inputs into a process. |
| Criteria: | Quality and accuracy of inputs - higher quality is generally considered a characteristic of greater mastery. |
| | Consistency of inputs - greater consistency is generally considered a characteristic of greater mastery. |
| | Frequency of inputs - greater frequency is generally considered a characteristic of greater mastery. |
| | Variety of or detail of inputs - broader considerations or more granular information is generally considered a characteristic of greater mastery. |
| | Timeliness of inputs - the timeliness of inputs from a cutoff or deadline, recency, and process alignment standpoint. Using more timely inputs is generally considered a characteristic of greater mastery. |
| | Understanding of inputs - a greater understanding of the inputs improves process effectiveness and is generally considered a characteristic of greater mastery. |

TABLE 5

Process Outputs Key Analysis Area

| | |
|---|---|
| Description: | Decisions, status, events, actions, information, materials, sub assembly, finished product, service delivered, and other process outputs. |
| Criteria: | Quality and accuracy of outputs - higher quality is generally considered a characteristic of greater mastery. |
| | Consistency of outputs - higher consistency is generally considered a characteristic of greater mastery. |
| | Frequency of outputs - greater frequency is generally considered a characteristic of greater mastery. |
| | Variety of or detail of outputs - broader considerations or more granular information is generally considered a characteristic of greater mastery. |
| | Timeliness of outputs - the timeliness of outputs from a cutoff or deadline, recency, and process alignment standpoint. Using more timely outputs is generally considered a characteristic of greater mastery. |
| | Understanding of outputs - a greater understanding of the outputs improves process effectiveness and is generally considered a characteristic of greater mastery. |

TABLE 6

Process Automation Key Analysis Area

| | |
|---|---|
| Description: | Extent of automation or tools used to shape, enable, or execute the process. |
| Criteria: | Single instance of an application (generally considered a characteristic of higher mastery) as opposed to multiple disparate versions of applications (generally considered a characteristic of lower mastery). |

TABLE 6-continued

Process Automation Key Analysis Area

Routine, repetitious tasks are highly automated (generally considered a characteristic of higher mastery) as opposed to being manually executed (generally considered a characteristic of lower mastery).

Higher number of users of automation (generally considered a characteristic of higher mastery) as opposed to a lower number of users (generally considered a characteristic of lower mastery).

Automation used as a competitive differentiator (generally considered a characteristic of higher mastery) as opposed to automation only as a common necessity (generally considered a characteristic of lower mastery).

Level of automated data and its ease of accessibility (generally considered a characteristic of higher mastery) as opposed to limited data automation and complicated access (generally considered a characteristic of lower mastery).

TABLE 7

Process Integration Key Analysis Area

| | |
|---|---|
| Description: | Extent of integration the process has with other processes, systems, tools, people, or 3rd parties. |
| Criteria: | Degree to which processes are integrated through timely execution and sequencing or parallel activity (generally considered a characteristic of higher mastery) as opposed to un-timed or out of sequence execution (generally considered a characteristic of lower mastery). |
| | Degree to which processes share information in real or near real time (generally considered a characteristic of higher mastery) as opposed to batched or manual data sharing (generally considered a characteristic of lower mastery). |
| | Degree to which decisions are made jointly with and uniformly communicated to appropriate business areas (generally considered a characteristic of higher mastery) as opposed to isolated or unrepresented decisions and disparate communication (generally considered a characteristic of lower mastery). |
| | Degree to which systems share data seamlessly and source it from a common or "virtually" common database (generally considered a characteristic of higher mastery) as opposed to multiple data sources that are not connected (generally considered a characteristic of lower mastery). |
| | Degree to which common applications or processes are used to execute the same task and achieve the same results (generally considered a characteristic of high mastery) as opposed to different applications or processes are used in an attempt to execute the same task, and often different, unintended results are achieved (generally considered a characteristic of lower mastery). |
| | Degree to which different applications have the same or similar interface and have a single access point/logon (generally considered a characteristic of higher mastery) as opposed to disparate applications with multiple logons and different interfaces (generally considered a characteristic of lower mastery). |

The following Tables 8-11 provide an explanation of each of the capability levels 120-126:

TABLE 8

'Basic' Capability Level

| | |
|---|---|
| Description: | Capability mastery at a basic level is indicative of a high level, unclear, undisciplined, or unsophisticated ability to execute the capability or process in a consistent, traceable, and repeatable manner. For non-core, low priority, new, or early adoption of certain process capabilities, a basic level may be acceptable to the organization or the organization may not have the resources to expand beyond the basic capability level. A basic level of mastery often indicates that an organization is lagging behind its competitors in its ability to execute the capability. |

TABLE 9

'Progressive' Capability Level

| | |
|---|---|
| Description: | Capability mastery at a progressive level is indicative of a conservative ability to execute the capability in a fairly consistent, traceable, and repeatable manner with proven techniques, tools and commonly accepted practices that are readily available and maintained. This capability mastery may be a strategic decision by the organization to be a follower or "good enough" operator in many respects or may be an interim step that organizations aspire to move beyond to achieve a leading mastery of the given capability. A progressive level of mastery often indicates that an organization is performing consistently with its competitors in its ability to execute a capability. |

TABLE 10

''Leading' Capability Level

| | |
|---|---|
| Description: | Capability mastery at a leading level is indicative of a highly detailed, clear, and often iterative and sophisticated ability to execute the capability. The leading capability is the recognized and referenced benchmark of continuous improvement and high performance for a given process capability. The leading process capability has been optimized for efficiency and effectiveness, is well understood, traceable, and consistently executed to the point of being competitively differentiated or at the top level of peer to peer comparison. |

TABLE 11

'Emerging' Capability Level

| | |
|---|---|
| Description: | Capability mastery at an emerging level is indicative of a clearly differentiated ability to execute the capability that is ahead of, unavailable to, or risky for the competition. The emerging process capability is characterized by innovation, integration, and thought leadership that looks to raise or change the standard set in the leading category of mastery, and over time become a required capability for sustained competitiveness, scale, and high performance. Emerging capability mastery is flexible in its characterization, as an organization may be considered as having an emerging capability mastery, even though it is only in limited production due to its uniqueness or early adoption, and has not yet "mastered" the capability at scale - but are far enough in advance of the competition that they will benefit from the lessons learned and early iterations of developing the capability. |

Figure 2:
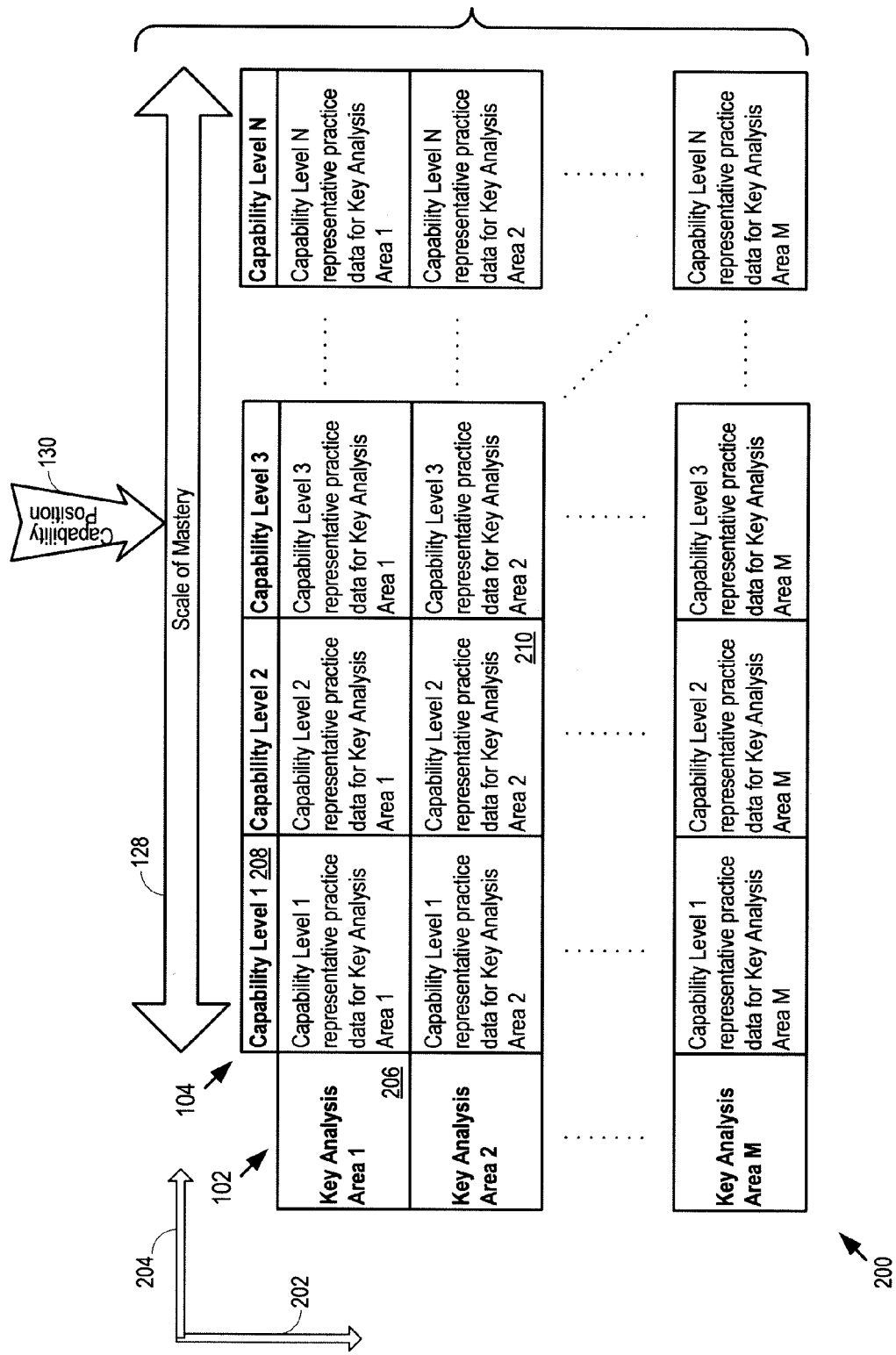
FIG. 2 shows a generalized capability analysis structure.

The capability analysis structure 100 is not limited to the form shown above in FIG. 1. Instead, the capability analysis structure 100 may be adapted and modified to fill a wide variety of analysis roles. In that regard, FIG. 2 shows a generalized capability analysis structure 200.

The generalized capability analysis structure 200 is organized along a key factor dimension 202 and a capability scale dimension 204. 'M' key analysis areas (e.g., 7 key analysis areas) are defined along the key factor dimension 202. One of the key analysis areas is labeled 206. Similarly, 'N' capability levels (e.g., 4, capability levels) are defined along the capability scale dimension 204. One of the capability levels is labeled 208. The scale of mastery 128 spans the key analysis areas along the capability scale dimension 204.

Representative practice data may populate the generalized capability analysis structure 200 in whole or in part. FIG. 2 labels a specific instance of representative practice data as the representative practice data 210 for capability level 2 for the key analysis area 2. The generalized capability analysis structure 200 and the representative practice data may reflect any desired business process, at any desired level of granularity along the key factor dimension 202 and capability scale dimension 204. FIG. 1 shows a specific instantiation of the generalized capability analysis structure 100 with seven key analysis areas and four capability levels.

Figure 3:
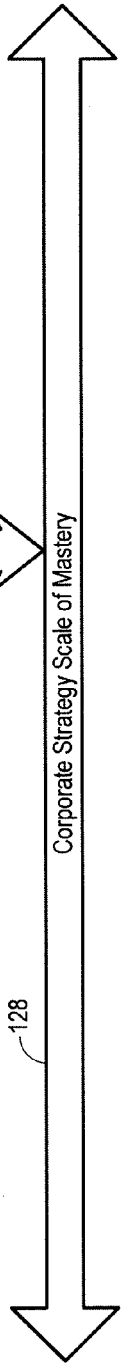
FIG. 3 shows two key analysis areas of a corporate strategy capability analysis structure.

FIG. 3 shows a specific example of the process participation and process creation key analysis areas for a corporate strategy capability analysis structure 300. In particular, FIG. 3 shows that for each of the 'Basic' capability level 120, 'Progressive' capability level 122, and the 'Leading' capability level 124, representative practice data exists in the structure 300. One specific example is the representative practice data 302, which provides a baseline for 'Basic' level process participation. Specifically, the representative practice data 302 establishes that 'Basic' level process participation for corporate strategy is characterized by "Little or no executive participation beyond the CEO. Board of Directors or Equity Partners may set or heavily influence the strategy."

FIG. 3 also shows the leading representative practice data 304 that provides a baseline for progressive level process participation. Specifically, the representative practice data 304 establishes that progressive level process participation for corporate strategy is characterized by "C-level/executive team participation—strategy is determined collaboratively. Board of Directors or equity partner review and approval if necessary." Accordingly, a process under examination may be mapped onto the scale of mastery 128 at any one of the multiple key analysis areas, with the structure 300 and providing a well defined set of capability levels, criteria for reaching each of the capability levels, and intermediate capability level goals defined between substantially different capability levels. FIG. 3 also illustrates that it is not necessary to have representative practice data for every combination of capability level and key analysis area. Specifically, FIG. 3 shows that the corporate strategy capability analysis structure 300 need not include 'Emerging' level process participation or process creation representative practice data. However, the corporate strategy capability analysis structure 300 may be revised to add such representative practice data as it is identified and standardized for application to corporate strategy processes.

Figure 4:
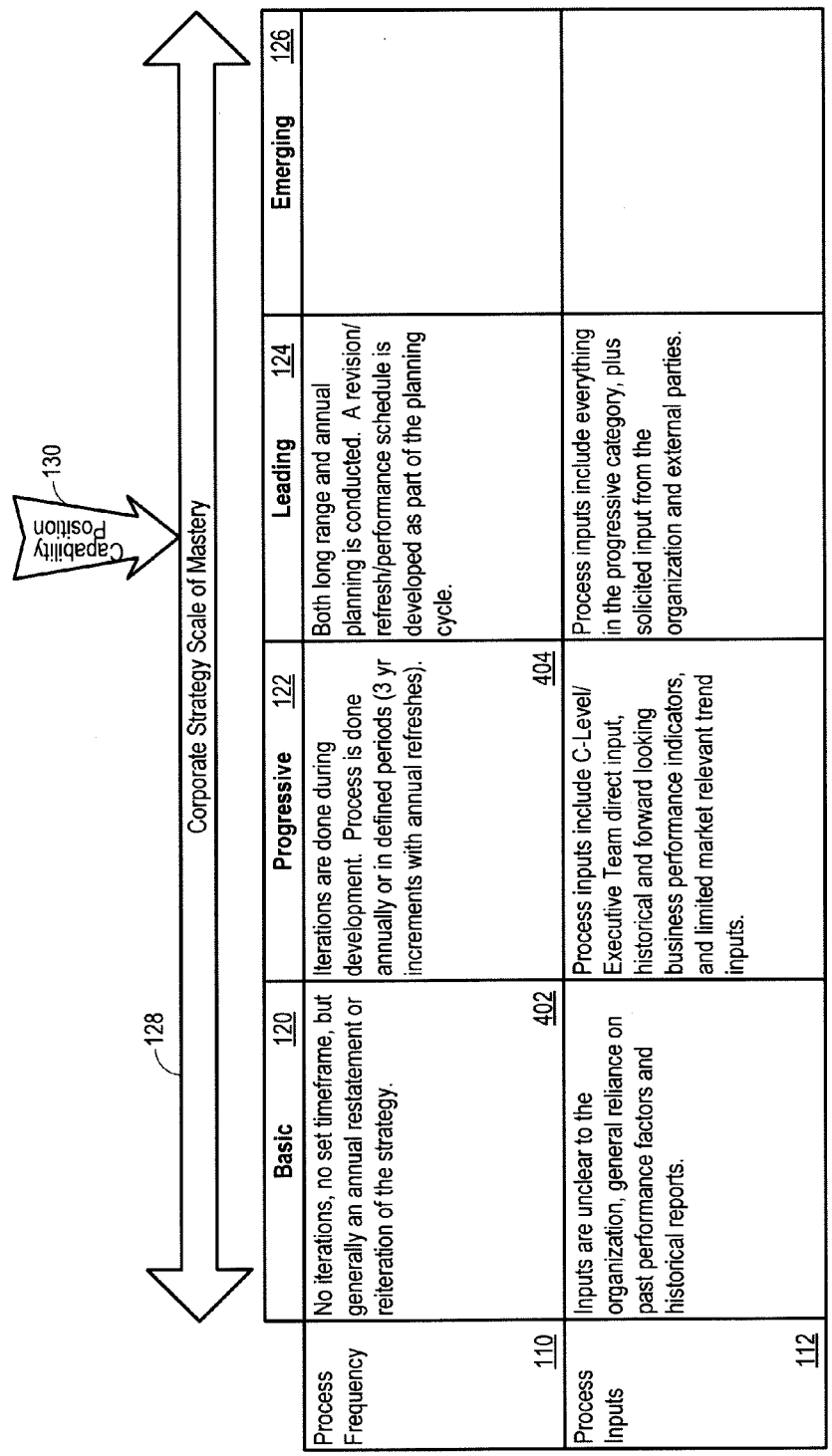
FIG. 4 shows two additional key analysis areas of a corporate strategy capability analysis structure.
Figure 5:
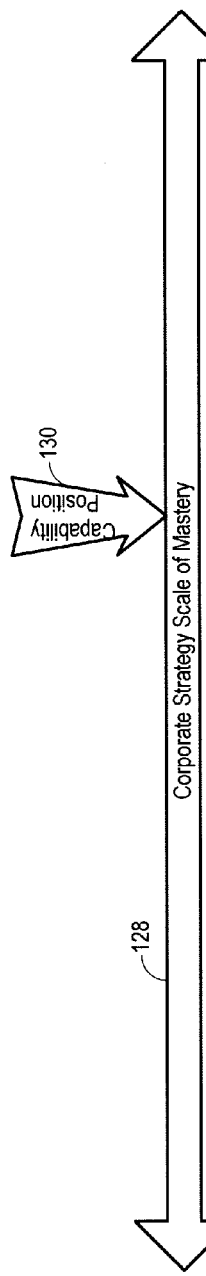
FIG. 5 shows three additional key analysis areas of a corporate strategy capability analysis structure.

FIG. 4 continues the example started in FIG. 3. In particular, FIG. 4 shows specific examples of process frequency and process inputs key analysis area representative practice data. Thus for example, the representative practice data 402 establishes baseline 'Basic' level process frequency characteristics. Similarly, the representative practice data 404 establishes 'Progressive' level process frequency characteristics. FIG. 5 shows that the corporate strategy capability analysis structure 300 also includes the process outputs key analysis area, the process automation key analysis area, and a process integration key analysis area. As specific examples, the representative practice data 502 establishes 'Progressive' level process outputs characteristics, while the representative practice data 504 establishes the 'Leading' level process outputs characteristics for corporate strategy.

Figure 6:
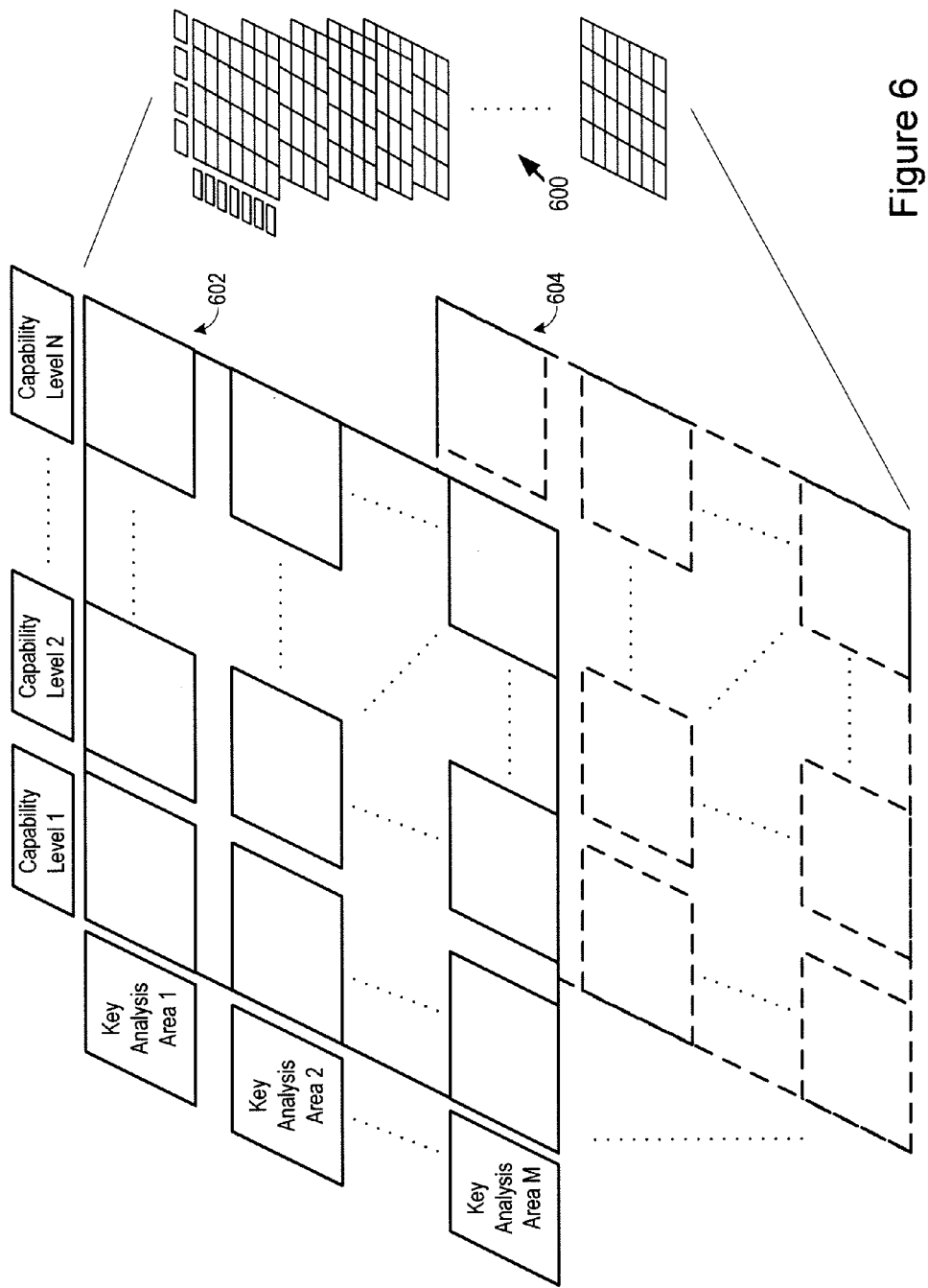
FIG. 6 shows a process detail pool that includes multiple pre-defined capability analysis structures.

As noted above, the capability analysis structures may be adapted for any desired business process. Furthermore, the individual capability analysis structures may be collected and stored for future retrieval and possible modification in a process detail pool. FIG. 6 illustrates a process detail pool 600 that includes multiple predefined capability analysis structures, two of which are labeled as the first capability analysis structure 602 and the last capability analysis structure 604.

The process detail pool may include as many or as few predefined capability analysis structures as desired. As a result, the process detail pool 600 captures a significant and important depth of experience that may be consulted when analyzing organizational capability in any particular process area. Each capability analysis structure in the process detail pool 600 may be populated with predefined representative practice data. Alternatively or additionally, the process detail pool 600 may store one or more capability analysis structure templates that are dynamically populated with the most up-to-date representative practice data upon retrieval and presentation (e.g., to a business analysis consultant). Such representative practice data may be retrieved from a representative practice data database or other information source.

Tables 12-17, below, provide examples of six different populated capability analysis structures for business processes ranging from corporate strategy to brand strategy to format strategy. While the examples below are specific to the retail process industry, capability analysis structures may be defined for and applied to any particular business industry.

Table 12 shows an example of a capability analysis structure suitable for Corporate Strategy analysis.

TABLE 12

Corporate Strategy Scale of Mastery Structure
<==========================SCALE OF MASTERY========================>

| | High-Level, No Clear Process | | Detailed, Iterative, Clear Process | |
| --- | --- | --- | --- | --- |
| | Basic | Progressive | Leading | Emerging |
| Process Participation Who | Little to no executive participation beyond the CEO. Board of Directors or Equity Partners may set or heavily influence the strategy. | C-Level/Executive Team participation-strategy is determined collaboratively. Board of Directors or Equity Partner review and approval if necessary. | C-Level/Executive Team determines strategy with managed input from non-executive influences such as employees, customers, and suppliers. | |
| Process Creation How | Strategy process is not defined or is loosely defined. | A process for strategy development is | A clear and consistent strategy development process is documented and | |

TABLE 12-continued

Corporate Strategy Scale of Mastery Structure

<============SCALE OF MASTERY============>

| | High-Level, No Clear Process | | Detailed, Iterative, Clear Process | |
|---|---|---|---|---|
| | Basic | Progressive | Leading | Emerging |
| What | Largely developed in isolation and dictated to leadership, with inconsistent communication to the organization. The annual plan is emphasized, with minimal long range planning detail. | followed, but may vary from year to year and is inconsistently applied or executed. The annual plan is emphasized, with the long range plan being done at 3 or 5 year intervals. | followed for both annual and long range plans. The strategic process includes a refresh of the corporate goals, business scope and plan, operating model, growth intent, and major change programs. | |
| Process Frequency Number of Iterations Frequency Revisions | No iterations, no set timeframe, but generally an annual restatement or reiteration of the strategy. | Iterations are done during development. Process is done annually or in defined periods (3 yr increments with annual refreshes). | Both long range and annual planning is conducted. A revision/refresh/performance schedule is developed as part of the planning cycle. | |
| Process Inputs Describe Inputs to Process | Inputs are unclear to the organization, general reliance on past performance factors and historical reports. | Process inputs include C-Level/Executive Team direct input, historical and forward looking business performance indicators, and limited market relevant trend inputs. | Process inputs include everything in the progressive category, plus solicited input from the organization and external parties. | |
| Process Outputs Describe Outputs of Process | Outputs are often unclear, with strategic intent and strategic motivators not well defined or communicated. Output is generally focused on sales lift and cost reduction messages. | A strategy document is produced and communicated to the organization, but often lacks specific targets and methods for strategy achievement. | A strategy document is completed, with strategic targets and expected methods to be deployed, and is communicated to stakeholders. | |
| Process Automation Describe Tools or Level of Automation Required in Process | Little to no automation is used. May involve presentation software such as PowerPoint, Excel spreadsheets, and email. | The process defines standard inputs and formats for strategy material. The system is used to generate reports and conduct data or comparative analysis used in strategy development. | Automated reports and data analysis tools are used in strategy, development, along with syndicated or subscribed data services for market and industry insights. Common templates are used to capture and communicate strategy inputs and outputs. | |
| Process Integration Describe integration points between this process and other processes, tool, systems, and other elements. | Integration points are generally email or meeting driven, between CEO and Board of Directors or Equity Partners. | The process is integrated into the periodic planning calendar, but generally no automated or other process integration is intentional, beyond perhaps an annual budgeting cycle. | This strategy development is integrated into the long range and annual planning calendars to coincide with fiscal year budgeting, and refreshes or updates are done to coincide with major shareholder meetings or analyst communications. | |

Table 13 shows an example of a capability analysis structure suitable for Customer Strategy analysis.

TABLE 13

Customer Strategy Scale of Mastery Structure

<==========================SCALE OF MASTERY==========================>

| | High-Level, No Clear Process | | Detailed, Iterative, Clear Process | |
|---|---|---|---|---|
| | Basic | Progressive | Leading | Emerging |
| Process Participation Who | Primary input coming from marketing group, with little input other than review and approval from C-Level/Executive Team or stores. | C-Level/Executive Team sets the customer strategy with input from the leadership of stores, marketing, and customer service. | Customer centric thinking is led by C-Level/Executive Team and they are directly involved in setting the customer strategy collaboratively with inputs from customers, stores, marketing, sales, and customer service. | |
| Process Creation How What | Unsophisticated process for assessing customers with little to no segmentation, limited data inputs or fact basis, offers tend to be product and service driven rather than based on customer preferences, little to no customer measurement. | Some customer segmentation analysis is done, offers are aligned with customer segments and customer performance is tracked and used in future planning. | Deep customer centric analysis is done and used to drive business activities including assortments and services, customer feedback is frequently captured and growth plans by customer segment and cluster are developed and followed. | |
| Process Frequency Number of Iterations Frequency Revisions | Customer strategy is only iterated during long range or annual planning. Typically customer strategy is looked at once during the year and rarely revised. | Customer strategy is incorporated into annual planning process and seasonal refreshes are incorporated for seasonal product. | Customer strategy is set annually, but customer wants and needs are tracked quarterly with revisions or enhancements evaluated throughout the year. | |
| Process Inputs Describe Inputs to Process | Limited customer insights and data are available, largely driven by historical customer purchase behavior vs. forward looking customer wants and needs. | Customer data is available and used in strategy process, though may be dated due to system constraints or inadequate analysis capability. | Extensive customer attributes and customer value analysis is done. Forward looking customer insights and near real time customer purchase behavior is integrated into the strategy process. | |
| Process Outputs Describe Outputs of Process | Customer strategy is broadly defined and not detailed at customer segment level. Overall customer growth is identified, but little to no measurement approach is included. | Customer strategy is defined by segment along with growth targets and measurement expectations. | Customer strategy is defined at customer segment and cluster level, with growth targets and sources of growth, value contribution, and measurement approach articulated in the strategy. | |
| Process Automation Describe Tools or Level of | Little automation is used, other than ad-hoc customer reports, in-store manual surveys | Online customer feedback is captured via the retailer website, | Customer feedback automation is deployed via in-store kiosks and | |

TABLE 13-continued

Customer Strategy Scale of Mastery Structure
<============SCALE OF MASTERY============>

| | High-Level, No Clear Process | | Detailed, Iterative, Clear Process | |
|---|---|---|---|---|
| | Basic | Progressive | Leading | Emerging |
| Automation Required in Process | and limited point-of-sale analysis as input into the strategy development process. | incorporated into strategy development process. | company websites to capture direct customer insights for strategy development. Common online templates are used across departments to capture customer centric ideas. | |
| Process Integration Describe integration points between this process and other processes, tool, systems, and other elements. | Limited integration points across the organization, customer strategy is set and cascaded down through the organization inconsistently. | Customer strategy is developed in parallel with corporate strategy areas and influences strategic outcomes. | Customer strategy is integrated into the corporate strategy processes and provides customer centric direction/context for all strategic development areas. Point-of-sale information is integrated into strategy process, along with customer loyalty and purchase data, demographic and syndicated data. | Customer growth, loyalty and satisfaction tied to group and individual incentives for performance against customer strategy. |

Table 14 shows an example of a capability analysis structure suitable for Brand Strategy analysis.

TABLE 14

Brand Strategy Scale of Mastery Structure
<============SCALE OF MASTERY============>

| | High-Level, No Clear Process | | Detailed, Iterative, Clear Process | |
|---|---|---|---|---|
| | Basic | Progressive | Leading | Emerging |
| Process Participation Who | Chief Marketing Officer and marketing department, with review by CEO and/or Board of Directors. | Chief Marketing Officer and Chief Customer Officer with review by C-Level/Executive Team and Board of Directors. | C-Level/Executive Team collaboration facilitated by Chief Marketing Officer and/or Chief Customer Officer. Review by Board of Directors. | |
| Process Creation How What | Marketing evaluates brand image against business performance and customer feedback. Brand strategy consists of recommended changes to brand based on historical information. | Leadership evaluates brand position against competition, business performance, and customer feedback. Brand strategy includes short and longer term recommendations for brand enhancement. | Leadership evaluates brand components by market, image, performance, and competition. Review retail offer pipeline and customer feedback to assess future brand positioning and strategy reflects near term and future adjustments at the brand component level. | |

TABLE 14-continued

Brand Strategy Scale of Mastery Structure
<==================SCALE OF MASTERY==================>

| | High-Level, No Clear Process | | Detailed, Iterative, Clear Process | |
|---|---|---|---|---|
| | Basic | Progressive | Leading | Emerging |
| Process Frequency Number of Iterations Frequency Revisions | Annually | Annually | Annually, with quarterly feedback from performance metrics to assess in-season marketing opportunities or adjustments. | |
| Process Inputs Describe Inputs to Process | Historical business performance and customer feedback. | Historical business performance, competitive position, customer feedback. | Retail offer pipeline, future customer and market trends, competitive activity, business performance, and customer feedback. | |
| Process Outputs Describe Outputs of Process | Brand strategy consisting of recommended changes to branding. | Brand strategy consisting of short and longer term brand enhancements. | Brand strategy that describes at the component level near term and future brand position, linkage to other strategy components, and brand measurements for target goals. | |
| Process Automation Describe Tools or Level of Automation Required in Process | No automation utilized in process beyond presentation software and system reports. | Some limited access to online survey or feedback tool capability and system reports. | Automated brand performance metrics, survey or feedback tools, and media or 3rd party reporting for brand performance and perception analysis. | |
| Process Integration Describe integration points between this process and other processes, tool, systems, and other elements. | No process integration | Some process integration with other strategy development efforts, sharing of information, and system tools. | Direct integration with overall company strategic processes, performance reporting, and customer feedback mechanisms. | |

Table 15 shows an example of a capability analysis structure suitable for Portfolio Strategy analysis.

TABLE 15

Portfolio Strategy Scale of Mastery Structure
<==================SCALE OF MASTERY==================>

| | High-Level, No Clear Process | | Detailed, Iterative, Clear Process | |
|---|---|---|---|---|
| | Basic | Progressive | Leading | Emerging |
| Process Participation Who | Chief Merchant and Chief Financial Officer. | C-Level/Executive Team collaboration facilitated by Chief Merchant and/or | Portfolio executive team - often consisting of Chief Merchant, Chief | |

TABLE 15-continued

Portfolio Strategy Scale of Mastery Structure
<============SCALE OF MASTERY============>

| | High-Level, No Clear Process | | Detailed, Iterative, Clear Process | |
|---|---|---|---|---|
| | Basic | Progressive | Leading | Emerging |
| | | Chief Financial officer. | Marketer, Chief Customer Officer, and Chief Financial Officer, with collaboration across C-Level/Executive Team and category leads. | |
| Process Creation How What | Portfolio strategy is limited in development, focusing mostly on individual assortments by category with little or no role definition, rather than a portfolio view across categories. | Portfolio strategy is developed with some level of role definition by category, basic analytics are used to determine category targets, but little sophistication is used to allocate resources. Multi-year view and emerging businesses usually not included. | Portfolio strategy leverages fact based analytics, roles are clearly defined, target financial goals are specific and resource allocation is commensurate with targeted goals. Portfolio strategy includes a multiyear view and addresses emerging businesses. | |
| Process Frequency Number of Iterations Frequency Revisions | Portfolio strategy is done annually, but little to no revisions are completed due to lack of in-season performance tracking and no understanding of overall portfolio sensitivity across categories is available. | Portfolio strategy is done annually, with a mid-year checkpoint for revision. | Portfolio strategy is done annually but with a multi-year view for emerging businesses, with quarterly refreshes or adjustments based on current performance, forecast, competitor actions, and market trend data. | |
| Process Inputs Describe Inputs to Process | Corporate strategy components and overall financial targets, current assortment, and historical performance. | Corporate strategy components, overall financial targets, customer insights, product historical performance, and projected assortment. | Corporate strategy components, overall financial targets, customer analytics, competitor analytics, future trends, current and future assortment, resource capacity and constraints, and supplier intelligence. | |
| Process Outputs Describe Outputs of Process | Portfolio strategy with assortments and financial targets by category. | Portfolio strategy with assortments, financial targets, category roles, and performance metrics by category. | Portfolio strategy with assortments, financial targets, category roles, category intent, performance metrics, and major special projects identified, along with multi-year view and emerging business opportunities. | |
| Process Automation Describe Tools or Level of Automation Required in Process | No automation is used in the process, other than presentation software and system reports. | Some automation used to perform basic analytics, along with system reports and presentation software. | Automation is used to perform business performance modeling and simulation, comparative data and trend analysis, forecasting, and financial analysis. | |

TABLE 15-continued

Portfolio Strategy Scale of Mastery Structure
<==================SCALE OF MASTERY==================>

| | High-Level, No Clear Process | | Detailed, Iterative, Clear Process | |
| --- | --- | --- | --- | --- |
| | Basic | Progressive | Leading | Emerging |
| Process Integration Describe integration points between this process and other processes, tool, systems, and other elements. | Little to no integration with other strategic planning, or operational functions such as supply chain or stores. | Portfolio strategy is integrated into strategic planning process and service as in input to merchandise financial planning, category plan management, and assortment planning, but integration with analytics and operational practices is limited or not emphasized. | Portfolio strategy is integrated with other strategy development, is data driven with analytics, and includes other functional areas such as supply chain, talent management, and store operations insights for optimizing category roles and target performance. Merchandise financial planning and category plan management are closely linked to execute and optimize the portfolio strategy. | |

Table 16 shows an example of a capability analysis structure suitable for Channel Strategy analysis.

TABLE 16

Channel Strategy Scale of Mastery Structure
<==================SCALE OF MASTERY==================>

| | High-Level, No Clear Process | | Detailed, Iterative, Clear Process | |
| --- | --- | --- | --- | --- |
| | Basic | Progressive | Leading | Emerging |
| Process Participation Who | Executive participation for review and approval, but largely driven by marketing only. | Executive leadership within sales, marketing, and customer service develops strategy, with C-Level/Executive Team review and approval. | C-Level/Executive Team leadership and collaboration on channel strategy development, facilitated by sales and marketing leadership. | |
| Process Creation How What | Executive participation for review and approval, but largely driven by marketing only. | Executive leadership within sales, marketing, and customer service develops strategy, with C-Level/Executive Team review and approval. | C-Level/Executive Team leadership & collaboration on channel strategy development, facilitated by sales and marketing leadership. | |
| Process Frequency Number of Iterations Frequency Revisions | Annual process with revisions occurring reactively when business issues arise. | Annual process with mid-year checkpoint to assess performance and areas for improvement or retirement. | Annual process with quarterly review and refreshes based on performance, competitive actions, and in some cases, technology changes or pilot decision points. | |

TABLE 16-continued

Channel Strategy Scale of Mastery Structure
<==========================SCALE OF MASTERY========================>

|  | High-Level, No Clear Process | | Detailed, Iterative, Clear Process | |
| --- | --- | --- | --- | --- |
|  | Basic | Progressive | Leading | Emerging |
| Process Inputs Describe Inputs to Process | Corporate strategy and customer strategy, assortment information and historical channel performance. | Corporate strategy, customer strategy, portfolio strategy, and format strategy, historical performance and technology availability. | Corporate strategy, customer strategy, portfolio strategy and format strategy components, historical performance and target expectations, technology advancements and availability. |  |
| Process Outputs Describe Outputs of Process | Channel strategy that includes financial targets by channel and resource allocation/prioritization by channel. | Channel strategy that includes channel roles, channel operating guidelines, financial targets, performance KPIs, and resource allocation. | Channel strategy that includes channel roles, cross channel integration components, financial targets, resource allocations, performance calendar and KPIs, channel standards and channel leadership roles. |  |
| Process Automation Describe Tools or Level of Automation Required in Process | Limited automation for historical performance analysis. | Automation used for historical performance analysis and limited forecasting of future channel performance. Also, select channel KPIs are automated for capture and tracking. | Automation used for channel performance analysis - historical and forecast modeling. Automation used for in stream channel performance against role and KPIs. | Sophisticated automation for modeling of channel performance and optimization, including integrated channel performance and channel sensitivities. |
| Process Integration Describe integration points between this process and other processes, tool, systems, and other elements. | Channel strategy process reflects corporate and customer strategy and is integrated into existing or required formats and operations. | Process is done in concert with overall strategy planning effort at corporate level. Channel strategy is constrained based on level of and support for integrated analytics. | Process is done collaboratively and in sync with overall strategy planning, and has the ability to influence other strategy elements based on integrated analytics. |  |

Table 17 shows an example of a capability analysis structure suitable for Format Strategy analysis.

TABLE 17

Format Strategy Scale of Mastery Structure
<==========================SCALE OF MASTERY========================>

|  | High-Level, No Clear Process | | Detailed, Iterative, Clear Process | |
| --- | --- | --- | --- | --- |
|  | Basic | Progressive | Leading | Emerging |
| Process Participation Who | Marketing with review and approval by CEO. | Marketing collaborates with real estate to develop proposals for C-Level/Executive | C-Level/Executive Team collaboration across functions to optimize format | Collaboration of input between internal and external functional and design groups |

TABLE 17-continued

Format Strategy Scale of Mastery Structure

<==========================SCALE OF MASTERY========================>

| | High-Level, No Clear Process | | Detailed, Iterative, Clear Process | |
| --- | --- | --- | --- | --- |
| | Basic | Progressive | Leading | Emerging |
| | | Team to review and select. | performance and cost balance. | with heavy customer focus group research and competitive analysis. |
| Process Creation How What | Customer and channel strategy are leveraged, format differentiation is assessed and construction costs are evaluated. | Customer and channel strategy are leveraged, format differentiation is determined based on competitor assessment and store clusters are developed. Construction constraints are applied and a single or multi format approach is determined. Alliance partners and concessionaires assist in shaping or are responsible for format of in-store shops where applicable. | Customer and channel strategy are leveraged, supplemented with additional competitor analysis to derive store clusters and to determine desired customer shopping experience, format options are developed, construction implications are assessed, and a single or multi-format approach is defined. Alliance partners responsible for format of in store shops where applicable. | Leverage of "designer personalities or design firms" to integrate design expertise into format decisions and link to brand image or drive format innovation. |
| Process Frequency Number of Iterations Frequency Revisions | 3-year planning cycle | 3-year planning cycle with annual revisions. | Short (annual) and long term planning cycles, annual revisions and ongoing yearly pilots for iteration and feedback. | Dynamic in-season or "time of day shopping occasion" formats with mobile fixtures and flexible merchandise sets. |
| Process Inputs Describe Inputs to Process | Corporate, customer, and channel strategy components. Construction and real estate costs. | All strategy platform components. Construction and real estate trends and cost forecasts. Technology trends and availability/affordability. | All strategy platform components. Construction and real estate trends and cost forecasts. Technology trends and availability/affordability. Format performance against plan and local market specifics. | All strategy platform components. Significant customer focus group research, external trend analysis, deep brand image assessments, competitor analysis, and local market specificity and influences. |
| Process Outputs Describe Outputs of Process | Format strategy that describes single or multi format approach and standards. | Format strategy that includes channel specific formats, media requirements, standards by channel. | Format strategy that includes channel specific formats, sensory stimulants, format standards, and local market variants. | |
| Process Automation Describe Tools or Level of Automation Required in Process | Financial modeling software for construction costing. | Store design software and financial modeling software. | Store design software, financial modeling software, planogramming software for fixture modeling and adjacency analysis, and flow path software for traffic patterns. | |
| Process Integration Describe integration points between this process and other processes, tool, systems, and other elements. | Integrates with corporate, customer and channel strategy. | Integrates with all strategy components, real estate expectations, and information technology. | Integrates with all strategy components, real estate expectations, cross functional operations, and information technology. | |

Figure 7:
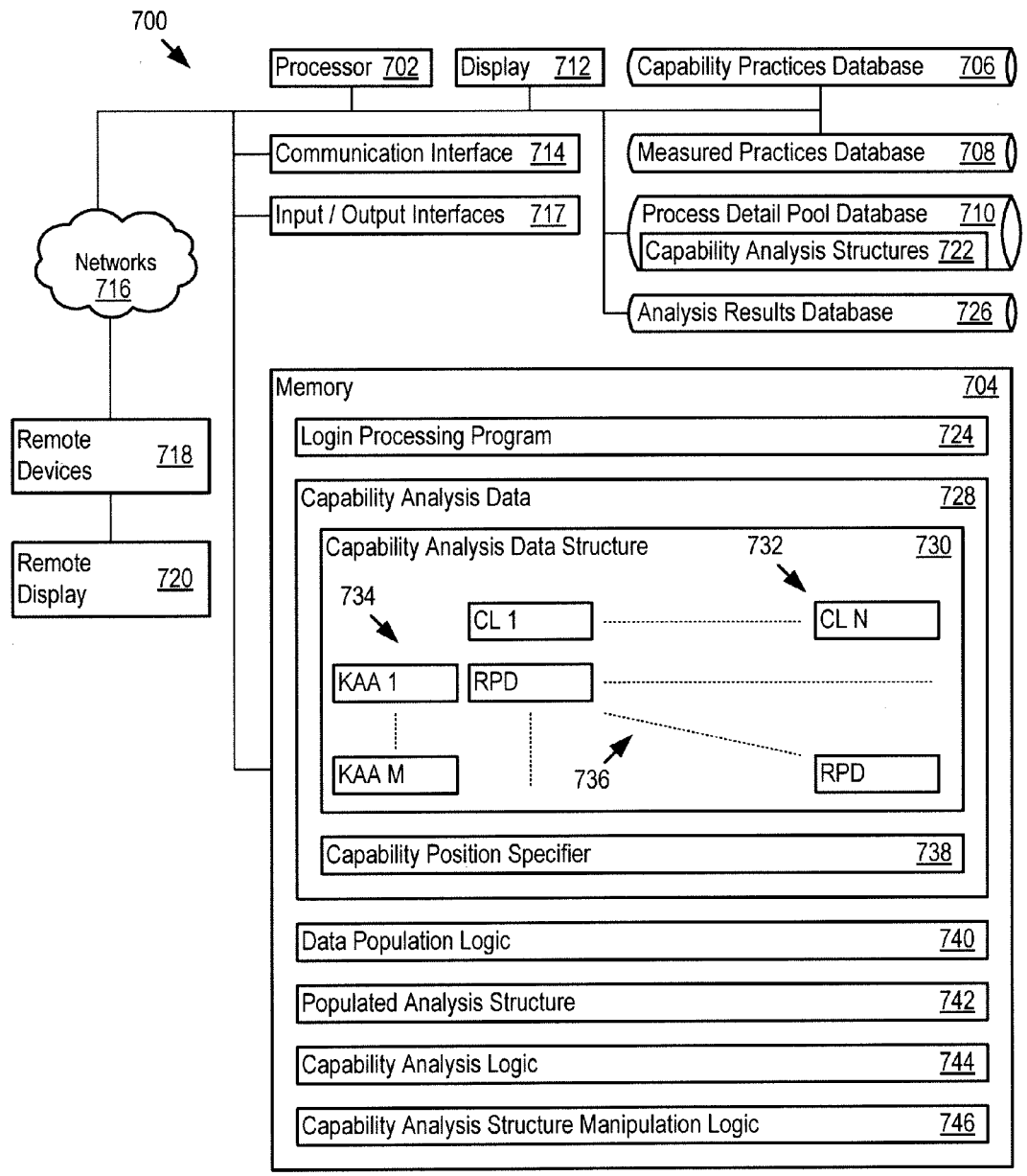
FIG. 7 shows a capability analysis system.

FIG. 7 shows a capability analysis system ("system") 700. The system 700 includes a processor 702 and a memory 704. Several databases support the operation of the system 700, including a capability practices database 706, a measured practices database 708, a process detail pool database 710, and an analysis results database 726. The system 700 may include a local display 712 and input/output interfaces 717 (e.g., including a keyboard, mouse, microphone, speakers, or other device), and, through the communication interface 714 and networks 716, may communicate with remote devices 718 and remote displays 720. The networks 716 may be any combination of external networks (e.g., the Internet) and internal networks (e.g., corporate LANs). The displays 712 and 720 may, for example, present capability analysis structures 722 that the system 700 retrieves from the process detail pool database 710 for review, modification, and application by business consultants or other individuals. With regard to local access or access by the remote devices 718, the system 700 may include a login processing program 724 to authenticate and/or authorize access to the system 700. To that end, the login processing program 724 may include username/password verification, private/public key encryption, or other validation and data protection capabilities.

The capability practices database 706 stores representative practice data. As will be described in more detail below, the system may populate capability analysis structures with representative practice data suited to any particular business process at one or more capability levels across one or more key analysis areas. The measured practices database 708 may store the determined, measured, or otherwise ascertained characteristics, criteria, and other measured practice data of a particular process as it is implemented at a business. The measured practices data may be obtained through interviews with business consultants, through online questionnaires, through manual or automated analysis of business data (e.g., year end operating reports), or in other manners. The process detail pool database 710 stores the process detail pool 600, which includes pre-defined capability analysis structures 722. The analysis results database 726 may store capability analysis structures and determined capability positions for specific business processes that have been analyzed.

The system 700 facilitates the review, modification, creation, and application of capability analysis structures. In that role, capability analysis structure manipulation logic ("manipulation logic") 746 in the system 700 creates, retrieves, and stores capability analysis data 728 in the memory 704. The manipulation logic 746 may establish capability analysis data 728 in the memory 704, including a capability analysis data structure 730 with multiple capability levels ("CL") 732 organized along a capability scale dimension, multiple key analysis areas ("KAA") 734 organized along a key factor dimension, and representative practice data ("RPD") 736 that populates the capability analysis structure 730. The manipulation logic 746 may vary widely in implementation, and, as one example, may include data storage logic that saves data in memory and user interface logic that accepts capability level specifications, key analysis area specifications, and representative practice data inputs to create new capability analysis structures, modify existing capability analysis structures, delete capability analysis structures, or retrieve capability analysis structures for review.

The capability analysis data 726 may also include a capability position specifier 738. The capability position specifier 738 may record the capability position along the scale of mastery, as determined for any particular business process. Thus, when the capability position has been determined, it may be stored for future retrieval and review in the system 700 in the analysis results database 726 or elsewhere.

The data population logic 740 (e.g., a data population program executed by the processor 702) may populate template capability analysis structures. For example, the data population logic 740 may include input logic that accepts an input specifying the specific business process for which a capability analysis structure is requested, query logic that executes database queries (or prompts a user for input) to obtain the corresponding representative practice data, and storage logic that adds the retrieved representative practice data to the template capability analysis structure. The data population logic 740 produces populated analysis structures 742 that may be stored in the process detail pool database 710.

In addition to the manual analysis process described above, the capability analysis system 700 may provide an automated analysis of the determined characteristics to the representative practice data. As one example, the capability analysis system 700 may implement capability analysis logic 744 that includes comparison and/or matching logic that analyzes the determined characteristics with respect to the representative practice data to determine where the process under examination exists at each capability level and at each of the specific key analysis areas.

Furthermore, the capability analysis logic 700 may determine an overall position on the scale of mastery 128 (e.g., the capability position specifier 738) for the process under examination given the knowledge of where the process under examination falls in each capability level and in each specific key analysis area. Thus, for example, the capability analysis logic 700 may determine an overall capability level corresponding to the capability level for the majority of the key analysis areas, or it may apply a weighted analysis technique to give more emphasis to some key analysis areas and others in determining the overall position on the scale of mastery 128. As another example, the capability analysis logic 700 may implement an expert system (e.g., based on a neural network trained on prior determinations) that analyzes the determined characteristics with respect to the representative practice data and that ascertains where the process under examination falls along the scale of mastery 128 for each of the key analysis areas, or overall on the scale of mastery 128.

Figure 8:
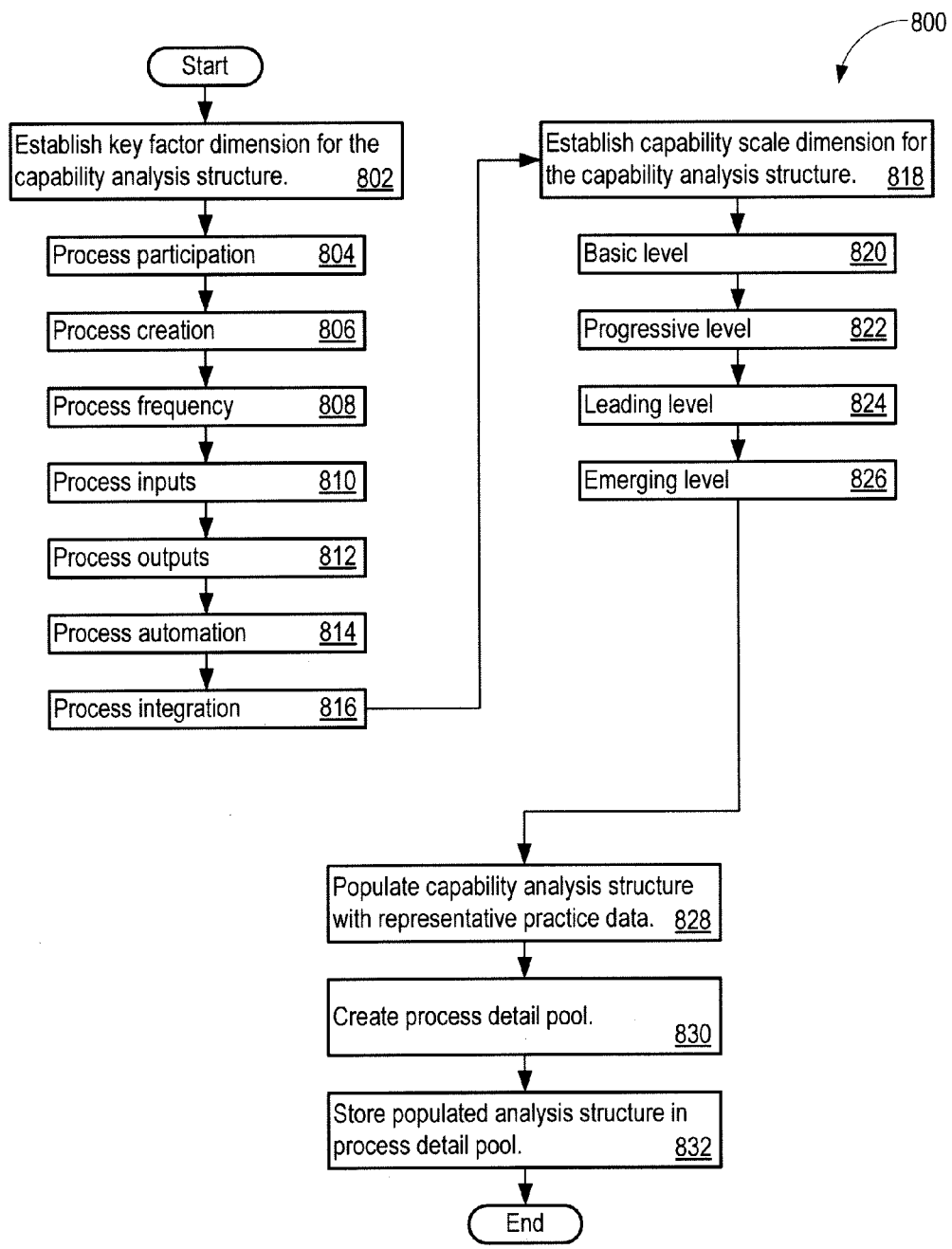
FIG. 8 shows a flow diagram for establishing capability analysis structures.

FIG. 8 shows a flow diagram 800 for creating capability analysis structures. The structure creator (e.g., the manipulation logic 746) establishes a key factor dimension for the capability analysis structure (802). As one specific example, the structure creator establishes, in the key factor dimension, seven key analysis areas: a process participation key analysis area (804), a process creation key analysis area (806), a process frequency key analysis area (808), a process inputs key analysis area (810), a process outputs key analysis area (812), a process automation key analysis area (814), and a process integration key analysis area (816).

The structure creator also establishes a capability scale dimension for the capability analysis structure (818). The capability scale dimension may define a scale of increasing organizational capability. For example, the structure creator may create a 'Basic' capability level (820), a 'Progressive' capability level (822), a 'Leading' capability level (824), and an 'Emerging' capability level (826).

The structure creator also populates the capability analysis structure with representative practice data (828). A process detail pool may be formed to hold multiple tailored capability analysis structures (830). The structure creator may store the populated analysis structure in the process detail pool for subsequent retrieval and analysis (832).

Figure 9:
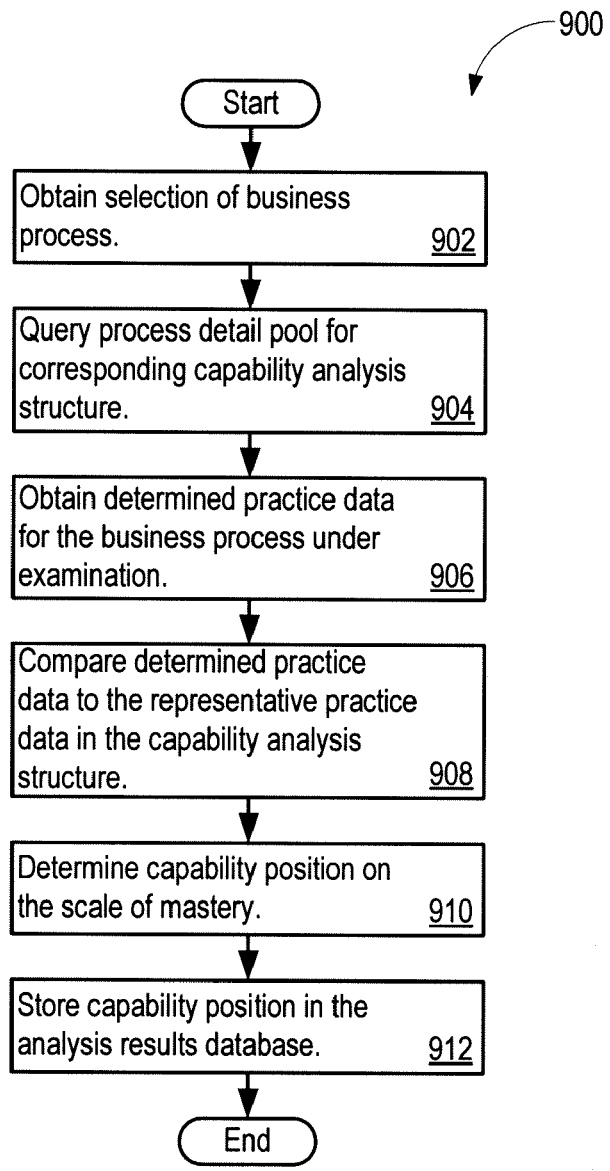
FIG. 9 shows a flow diagram for retrieving and applying capability analysis structures.

FIG. 9 shows a flow diagram 900 for retrieving and applying capability analysis structures. A selection of a business process to be analyzed is obtained (902). For example, the system 700 may accept input from a business consultant that specifies the business process (e.g., corporate strategy) for analysis. The system 700 may query a process detail pool 600 for a corresponding capability analysis structure (904). The corresponding capability analysis structure may be pre-defined in the pool (e.g., for corporate strategy), or the data population logic 730 (or other actor) may populate a template capability analysis structure that the system newly creates, or that is retrieved from a data store, such as the process detail pool database 710.

Practice data is obtained for the process under examination in the specific business under review (906). For example, a business consultant may interview the business to determine how the business currently executes the process under review. As another example, a representative from the business may complete a questionnaire, submit business data for analysis and parameter extraction, or otherwise provide the characteristics of their current process execution.

The determined practice data is compared to the representative practice data in the capability analysis structure (908). For example, a business consultant may use his or her expertise to arrive at a determination of capability position for the business and the process under examination (910). Alternatively or additionally, the capability analysis logic 744 may perform an automated analysis of the determined practice data and ascertain the capability position on the scale of mastery (910). The system 700 may store the analysis results, including the determined capability position, for future reference in the analysis results database 726 or other location (912).

Although selected aspects, features, or components of the implementations are depicted as being stored in computer-readable memories (e.g., as computer-executable instructions or capability analysis structures), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system 700 may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be combined or split among multiple programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for capability analysis comprising the steps of:
   providing a processor operatively coupled to memory, the memory having a capability analysis structure further comprising:
   a key factor dimension comprising any combination of two or more of:
      a process participation key analysis area;
      a process creation key analysis area;
      a process frequency key analysis area;
      a process inputs key analysis area;
      a process outputs key analysis area;
      a process automation key analysis area; and
      a process integration key analysis area;
         wherein each of the key analysis areas includes a retail industry specific key analysis area;
   providing a capability scale dimension comprising multiple capability levels, including:
      a 'Basic' capability level specifying a 'Basic' capability assessment criteria wherein the 'Basic' capability assessment criteria for a corporate strategy includes Process Participation criteria where little to no executive participation beyond the CEO exists and the board of directors or equity partners set or heavily influence strategy;
      a 'Progressive' capability level specifying a 'Progressive' capability assessment criteria wherein the 'Progressive' capability assessment criteria for a corporate strategy includes Process Participation criteria where strategy is determined collaboratively and the board of directors or equity partners review and approve if necessary;
      a 'Leading' capability level specifying a 'Leading' capability assessment criteria wherein the 'Leading' capability assessment criteria for a corporate strategy includes Process Participation criteria where an executive team determines strategy with managed input from non-executive influences including employees, customers, or suppliers;
   generating, using the processor coupled to data population logic in communication with the memory, a populated analysis structure from the capability analysis structure;
   receiving, by the processor, an input specifying a key analysis area corresponding to a retail business under examination;
   searching, by the processor, the populated analysis structure for criteria that matches the key analysis area corresponding to the retail business under examination;
   analyzing, by the processor, the matching criteria; and
   obtaining, by the processor, a resultant performance level of the retail business under examination corresponding to the capability scale dimension.

2. The method product of claim 1, where the capability scale dimension comprises a scale of increasing organizational capability.

3. The method of claim 1, where the logic is further operable to:
   obtain the representative practice data from a capability practices database; and
   populate the capability analysis structure with the representative practice data.

4. The method of claim 1, where the logic is further operable to obtain and store a capability position specifier associated with the capability analysis structure.

5. A capability analysis method comprising the steps of:
providing a processor operatively coupled to memory, the memory defining a capability analysis structure having a key factor dimension for the capability analysis structure, the key factor dimension comprising any combination of two or more of:
   a process participation key analysis area;
   a process creation key analysis area;
   a process frequency key analysis area;
   a process inputs key analysis area;
   a process outputs key analysis area;
   a process automation key analysis area; and
   a process integration key analysis area;
   where each of the key analysis areas includes a retail industry specific key analysis area
establishing, in the memory, a capability scale dimension for the capability analysis structure, the capability scale dimension comprising multiple capability levels, including:
   a 'Basic' capability level specifying a 'Basic' capability assessment criteria wherein the 'Basic' capability assessment criteria for a corporate strategy includes Process Creation criteria where strategy process is not defined or is loosely defined and largely developed in isolation and dictated to leadership, with inconsistent communication to the organization and where an annual plan is emphasized, with minimal long range planning detail;
   a 'Progressive' capability level specifying a 'Progressive' capability assessment criteria wherein the 'Progressive' capability assessment criteria for a corporate strategy includes Process Creation criteria where a process for strategy development is followed but may vary from year to year and is inconsistently applied or executed and where an annual plan is emphasized, with the long range plan being done at 3 or 5 year intervals;
   a 'Leading' capability level specifying a 'Leading' capability assessment criteria wherein the 'Leading' capability assessment criteria for a corporate strategy includes Process Creation criteria where a clear and consistent strategy development process is documented and followed for both annual and long range plans and the strategic process includes a refresh of the corporate goals, business scope and plan, operating model, growth intent, and major change programs;
generating, using the processor coupled to data population logic in communication with the memory, a populated analysis structure from the capability analysis structure;
receiving, by the processor, an input specifying a key analysis area corresponding to a retail business under examination;
searching, by the processor, the populated analysis structure for criteria that matches the key analysis area corresponding to the retail business under examination;
analyzing, by the processor, the matching criteria; and
obtaining, by the processor, a resultant performance level of the retail business under examination corresponding to the capability scale dimension.

6. The method of claim 5, where establishing the key factor dimension comprises:
establishing any combination of three or more of:
   a process participation key analysis area;
   a process creation key analysis area;
   a process frequency key analysis area;
   a process inputs key analysis area;
   a process outputs key analysis area;
   a process automation key analysis area; and
   a process integration key analysis area.

7. The method of claim 5, where establishing the key factor dimension comprises:
establishing any combination of five or more of:
   a process participation key analysis area;
   a process creation key analysis area;
   a process frequency key analysis area;
   a process inputs key analysis area;
   a process outputs key analysis area;
   a process automation key analysis area; and
   a process integration key analysis area.

8. The method of claim 5, further comprising:
storing the capability analysis structure in a process detail pool comprising multiple capability analysis structures, each tailored for analysis of a specific business process.

9. A capability analysis system comprising:
a processor operatively coupled to memory, the memory having a capability analysis structure further comprising:
   a key factor dimension comprising any combination of two or more of:
      a process participation key analysis area;
      a process creation key analysis area;
      a process frequency key analysis area;
      a process inputs key analysis area;
      a process outputs key analysis area;
      a process automation key analysis area;
      a process integration key analysis area;
      where each of the key analysis areas includes a retail industry specific key analysis area;
   a capability scale dimension comprising multiple capability levels, including:
      a 'Basic' capability level specifying a 'Basic' capability assessment criteria wherein the 'Basic' capability assessment criteria for a corporate strategy includes Process Participation criteria where little to no executive participation beyond the CEO exists and the board of directors or equity partners set or heavily influence strategy;
      a 'Progressive' capability level specifying a 'Progressive' capability assessment criteria wherein the 'Progressive' capability assessment criteria for a corporate strategy includes Process Participation criteria where strategy is determined collaboratively and the board of directors or equity partners review and approve if necessary;
      a 'Leading' capability level specifying a 'Leading' capability assessment criteria wherein the 'Leading' capability assessment criteria for a corporate strategy includes Process Participation criteria where an executive team determines strategy with managed input from non-executive influences including employees, customers, or suppliers; and
   data population logic coupled to the processor and in communication with the memory, configured to generate a populated analysis structure from the capability analysis structure;
the processor configured to:
   receive an input specifying a key analysis area corresponding to a retail business under examination;
   search the populated analysis structure for criteria that matches the key analysis area corresponding to the retail business under examination;
   analyze the matching criteria; and obtain a resultant performance level of the retail business under examination corresponding to the capability scale dimension.

10. The system of claim 9, where the memory further comprises:
capability analysis logic operable to compare the populated capability analysis structure against the measured practices data and determine a capability position specifier.

11. The system of claim 9, further comprising a capability practices database comprising the representative practice data.

12. The system of claim 9, further comprising a measured practices database comprising the measured practices data.

13. The system of claim 9, where the multiple capability levels comprise an ordered sequence of capability.

14. The system of claim 9, where the data population logic is operable to:
accept a capability selection from a set of capabilities of interest;
retrieve the representative practice data specific to the capability selection; and
generate the populated analysis structure based on the representative practice data specific to the capability selection.

15. The system of claim 9, further comprising:
a process detail pool database comprising multiple capability analysis structures, including the populated analysis structure, each tailored for analysis of a specific business process.

16. A capability analysis system comprising:
a processor operatively coupled to a memory, the memory having a capability analysis structure comprising:
a key factor dimension comprising any combination of two or more of:
a process participation key analysis area;
a process creation key analysis area;
a process frequency key analysis area;
a process inputs key analysis area;
a process outputs key analysis area;
a process automation key analysis area;
a process integration key analysis area;
where each of the key analysis areas includes a retail industry specific key analysis area;
a capability scale dimension comprising multiple capability levels, including:
a 'Basic' capability level specifying a 'Basic' capability assessment criteria wherein the 'Basic' capability assessment criteria for a corporate strategy includes Process Creation criteria where strategy process is not defined or is loosely defined and largely developed in isolation and dictated to leadership, with inconsistent communication to the organization and where an annual plan is emphasized, with minimal long range planning detail;
a 'Progressive' capability level specifying a 'Progressive' capability assessment criteria wherein the 'Progressive' capability assessment criteria for a corporate strategy includes Process Creation criteria where a process for strategy development is followed but may vary from year to year and is inconsistently applied or executed and where an annual plan is emphasized, with the long range plan being done at 3 or 5 year intervals;
a 'Leading' capability level specifying a 'Leading' capability assessment criteria wherein the 'Leading' capability assessment criteria for a corporate strategy includes Process Creation criteria where a clear and consistent strategy development process is documented and followed for both annual and long range plans and the strategic process includes a refresh of the corporate goals, business scope and plan, operating model, growth intent, and major change programs;
data population logic coupled to the processor and in communication with the memory configured to generate a populated analysis structure from the capability analysis structure;
the processor configured to:
receive an input specifying a key analysis area corresponding to a retail business under examination;
search the populated analysis structure for criteria that matches the key analysis area corresponding to the retail business under examination;
analyze the matching criteria; and
obtain a resultant performance level of the retail business under examination corresponding to the capability scale dimension.

17. A capability analysis system comprising:
a processor operatively coupled to memory, the memory having a capability analysis structure comprising:
a key factor dimension comprising any combination of two or more of:
a process participation key analysis area;
a process creation key analysis area;
a process frequency key analysis area;
a process inputs key analysis area;
a process outputs key analysis area;
a process automation key analysis area;
a process integration key analysis area;
where each of the key analysis areas includes a retail industry specific key analysis area;
a capability scale dimension comprising multiple capability levels, including:
a 'Basic' capability level specifying a 'Basic' capability assessment criteria wherein the 'Basic' capability assessment criteria for a customer strategy includes Process Participation criteria where primary input comes from a marketing group, with little input other than review and approval from a C-Level/executive team or stores;
a 'Progressive' capability level specifying a 'Progressive' capability assessment criteria wherein the 'Progressive' capability assessment criteria for a customer strategy includes Process Participation criteria where a C-Level/executive team sets customer strategy with input from the leadership of stores, marketing, and customer service;
a 'Leading' capability level specifying a 'Leading' capability assessment criteria wherein the 'Leading' capability assessment criteria for a customer strategy includes Process Participation criteria where customer centric thinking is led by a C-Level/executive team and they are directly involved in setting the customer strategy collaboratively with inputs from customers, stores, marketing, sales, and customer service;
data population logic coupled to the processor and in communication with memory, configured to generate a populated analysis structure from the capability analysis structure;
the processor configured to:
receive an input specifying a key analysis area corresponding to a retail business under examination;

search the populated analysis structure for criteria that matches the key analysis area corresponding to the retail business under examination;

analyze the matching criteria; and obtain a resultant performance level of the retail business under examination corresponding to the capability scale dimension.

18. A capability analysis system comprising:

a processor operatively coupled to memory, the memory having a capability analysis structure comprising:

a key factor dimension comprising any combination of two or more of:

a process participation key analysis area;
    a process creation key analysis area;
    a process frequency key analysis area;
    a process inputs key analysis area;
    a process outputs key analysis area;
    a process automation key analysis area;
    a process integration key analysis area;
    where each of the key analysis areas includes a retail industry specific key analysis area;

a capability scale dimension comprising multiple capability levels, including:

a 'Basic' capability level specifying a 'Basic' capability assessment criteria wherein the 'Basic' capability assessment criteria for a customer strategy includes Process Creation criteria using unsophisticated an process for assessing customers with little to no segmentation, limited data inputs or fact basis, and offers tend to be product and service driven rather than based on customer preferences, with little to no customer measurement;

a 'Progressive' capability level specifying a 'Progressive' capability assessment criteria wherein the 'Progressive' capability assessment criteria for a customer strategy includes Process Creation criteria where some customer segmentation analysis is done, offers are aligned with customer segments, and customer performance is tracked and used in future planning;

a 'Leading' capability level specifying a 'Leading' capability assessment criteria wherein the 'Leading' capability assessment criteria for a customer strategy includes Process Creation criteria where deep customer centric analysis is done and used to drive business activities including assortments and services, customer feedback is frequently captured and growth plans by customer segment, and clusters are developed and followed;

data population logic coupled to the processor and in communication with the memory, configured to generate a populated analysis structure from the capability analysis structure;

the processor configured to:

receive an input specifying a key analysis area corresponding a retail business under examination;

search the populated analysis structure for criteria that matches the key analysis area corresponding to the retail business under examination, analyze the matching criteria; and obtain a resultant performance level of the retail business under examination corresponding to the capability scale dimension.

\* \* \* \* \*